United States Patent
Leow et al.

(10) Patent No.: US 7,091,969 B2
(45) Date of Patent: Aug. 15, 2006

(54) FRONTIER ADVANCING POLYGONIZATION

(75) Inventors: Wee K Leow, Singapore (SG);
Zhiyong Huang, Singapore (SG);
Luping Zhou, Singapore (SG);
Indriyati Atmosukarto, Singapore (SG)

(73) Assignee: National University of Singapore, Singapore (SG)

( * ) Notice: Subject to any disclaimer, the term of this patent is extended or adjusted under 35 U.S.C. 154(b) by 814 days.

(21) Appl. No.: 09/969,062

(22) Filed: Oct. 2, 2001

(65) Prior Publication Data

US 2003/0063085 A1  Apr. 3, 2003

(51) Int. Cl.
*G06T 17/00* (2006.01)
(52) U.S. Cl. ............... 345/420; 345/423; 345/428; 345/629; 345/630; 345/581; 382/154
(58) Field of Classification Search .............. 345/419, 345/420, 423, 428, 581, 629, 630; 382/154
See application file for complete search history.

(56) References Cited

U.S. PATENT DOCUMENTS

| | | | |
|---|---|---|---|
| 5,428,726 A | 6/1995 | Piegl et al. | 395/141 |
| 5,677,846 A | 10/1997 | Kumashiro | 364/488 |
| 5,880,977 A | 3/1999 | Syo | 364/578 |
| 5,886,702 A | 3/1999 | Migdal et al. | 345/423 |
| 5,945,996 A | 8/1999 | Migdal et al. | 345/420 |
| 6,075,541 A | 6/2000 | Maclinovsky | 345/423 |
| 6,806,874 B1* | 10/2004 | Biermann et al. | 345/420 |

FOREIGN PATENT DOCUMENTS

| JP | 07-219977 | 8/1995 |
|---|---|---|
| JP | 2000-076486 | 3/2000 |

OTHER PUBLICATIONS

Atmoskarto et al., "Mesh Construction from Non-Uniformly Distributed and Noisy 3D Points Recovered from Image Sequence", May 2000, IEEE 0-7695-0868, pp. 423-424.*

(Continued)

*Primary Examiner*—Kimbinh T. Nguyen
(74) *Attorney, Agent, or Firm*—Dinsmore & Shohl LLP

(57) ABSTRACT

A method of polygonizing an object calculates indicators that points within a set (Q) of points within three space representing the object likely lie near a surface discontinuity of the object. A global mesh is formed around a point that likely does not lie near a surface discontinuity (i.e. a reliable point). Local meshes are formed about reliable points on the frontier of this global mesh. Each local mesh is combined with the global mesh, thereby adding to the global mesh and advancing the frontier. Once a local mesh has been formed about each reliable point on the frontier and added to the global mesh, a local mesh may be formed about a point on the frontier that is more likely to lie near a surface discontinuity. The formation of local meshes can be repeated until no frontiers are left, or until all points have been added to the global mesh.

18 Claims, 5 Drawing Sheets

OTHER PUBLICATIONS

Amenta, N., et al., "A New Voronoi-Based Surface Reconstruction Algorithm", In *Proc.* SIGGRAPH '98, pp. 415-421, 1998.

Bajaj, C.L. et al., "Automatic Reconstruction of Surfaces and Scalar Fields From 3D Scans", Computer Graphics Proceedings, Annual Conference Series, 1995, pp. 109-118.

Curless B., et al., "A Volumetric Method for Building Complex Models from Range Images", Computer Graphics Proceedings, Annual Conference Series, 1996, pp. 303-312.

Edelsbrunner, H., et al., "On the Shape of a Set of Points in the Plane", IEEE Transactions on Information Theory, vol. IT-29, No. 4, Jul. 1983, pp. 551-559.

Edelsbrunner, H., et al., "Three-Dimensional Alpha Shapes", ACM Transactions on Graphics, vol. 13, No. 1, Jan. 1994, pp. 43-72.

Green, P.J., et al., "Computing Dirichlet Tessellations In the Plane", The Computer Journal, vol. 21, No. 2, 1978, pp. 168-173.

Guibas, L.J., et al. "Randomized Incremental Construction of Delaunay and Voronoi Diagrams", Algorithmica, 1992, pp. 381-413.

Hoppe, H., et al., "Surface Reconstruction From Unorganized Points." In *Proc.* SIGGRAPH '92, 1992, pp. 71-78.

Lawson, C.L., "Transforming Triangulations", Discrete Mathematics, 1972, pp. 365-372.

Patent Abstract of Japan, 07-219977, Method for Generating Mesh, Aug. 18, 1995.

Patent Abstract of Japan, 2000-076486, Meshing Method and Its Device, Mar. 14, 2000.

* cited by examiner

FRONTIER ADVANCING POLYGONIZATION

FIELD OF THE INVENTION

The present invention relates to computing methods, software and devices used to model objects, and more particularly to methods and devices for constructing a mesh from a set of points in three space representing an object, extracted from one or more images.

BACKGROUND OF THE INVENTION

Modern computer graphics often rely on the use of modeled objects. Such objects are often modeled using polygons. Conveniently, objects so modeled may easily be rotated, scaled, and otherwise manipulated.

As a consequence, the formation of a suitable polygons to represent an object, often referred to as polygonization, is becoming of great significance in the field of computer graphics. An object is typically polygonized by forming a mesh of interconnected polygons from a collection of points in three space recovered from one or more images depicting the object.

Example uses of polygonized objects, include three dimensional ("3D") games, virtual reality games, and multimedia applications. In such applications 3D objects and scenes are typically represented as meshes so that graphics acceleration hardware can be utilized to generate high quality images of the objects and scenes. Furthermore, most of conventional animation techniques, are best processed using polygonized representations of objects.

Similarly, in the manufacturing industry, almost all computer-aided design, engineering, and manufacturing (CAD/CAE/CAM) software use 3D meshes for finite element analysis, assembly planning, process automation, and manufacturing using numerical control.

Likewise, the inclusion of 3D objects using mark-up languages for presentation on Internet web pages is becoming a trend. In many Internet standards for presenting 3D content, e.g., VRML2, MPEG-4, and Java3D, polygonized objects are of increasing significance.

Even though polygonization has been actively studied for about ten years, many challenges still exist. For example, many known algorithms only work for objects that do not have holes, and cannot handle shapes such as torroids and the like, for example. Examples of these algorithms include approaches using deformable models. Similarly, many known algorithms cannot reliably locate shape boundaries—shape boundaries are usually smoothed out. Yet other known algorithms produce meshes with holes caused by the non-uniform sampling of 3D points. Moreover, the presence of noise can severely deteriorate the polygonization results.

Abstractly, polygonization methods seek to construct a polygon mesh, possibly with boundary, from sampled points in 3D space without any additional information about the structure or organization of points (see for example H. Hoppe, T. DeRose, T. Duchamp, J. McDonald, and W. Stuetzle. "Surface reconstruction from unorganized points." In Proc. SIGGRAPH '92, pages 71–78, 1992). A more complete approach further constrains the sampled 3D points by additional features present in the images from which the points are sampled. (see, for example N. Amenta, M. Bern, and M. Kamvysselis. "A new Voronoi-based surface reconstruction algorithm." In Proc. SIGGRAPH '98, pages 415–421, 1998 ).

Example known polygonization algorithms include the zero-set algorithm as detailed in B. Curless and M. Levoy. "A volumetric method for building complex models from range images." In Proc. SIGGRAPH '96, pages 303–312, 1996 and H. Hoppe, T. DeRose, T. Duchamp, J. McDonald, and W. Stuetzle. "Surface reconstruction from unorganized points." In Proc. SIGGRAPH '92, pages 71–78, 1992; "crust algorithms" and "alpha shape algorithms" detailed in H. Edelsbrunner, D. G. Kirkpatrick, and R. Seidel. "On the shape of a set of points in the plane." IEEE Trans. on Information Theory, 29:551–559, 1983, and H. Edelsbrunner and E. P. Mucke. "Three-dimensional alpha shapes." ACM TOG, 13:43–72, 1994;

The zero-set algorithms are based on a volumetric framework. A signed distance function in three space is defined from the input points and their zero-sets are computed as the output mesh. These algorithms, however, produce approximating meshes (i.e. ones that approximate sampled points) instead of interpolating meshes (i.e. ones that are formed from, and contain the sampled points).

The alpha-shape and crust algorithms make use of Voronoi diagrams and Delaunay triangulation to construct triangle mesh. A Voronoi diagram for an arbitrary set of points may be formed from convex polygons created from the perpendicular bisector of lines between nearest neighboring points. Delaunay triangulation forms a mesh using the Voronoi diagrams.

The alpha-shape algorithms use a simplex (edge, triangle, or tetrahedron) in an alpha-shape if it contains some circumspheres with no interior sample points. A 3D circumsphere is a sphere of radius alpha whose surface touches at least three sample points. The alpha-shapes for all possible values of alpha approximate the overall shape and natural dimensionality of a set of sampled points. Alpha-shape algorithms cannot readily be applied to non-uniformly distributed sets of 3D points. Similarly, non-uniformly distributed sets of 3D points cannot be easily clustered into clusters having a fixed sampling density for assigning a fixed alpha.

The crust algorithm uses three-dimensional Voronoi diagram with provable guarantees. Advantageously, the output is guaranteed to be topologically correct and convergent to the original surface as the sampling density increases for a "good sample" from a smooth surface. A "good sample" has a sampling density that varies locally so as to rigorously capture the intuitive notion that featureless areas can be reconstructed from fewer samples. Unfortunately, collecting such a "good sample" is difficult for 3D points recovered from arbitrary images. Moreover, the crust algorithm does not process surface discontinuities well.

Accordingly, there is a need for improved methods of polygonization, that may be used to polygonize arbitrary shapes including surface discontinuities.

SUMMARY OF THE INVENTION

The present invention calculates indicators that points within a set (Q) extracted from one or more images depicting an object likely lie near a surface discontinuity of the object. A global mesh is formed around a point that likely does not lie near a surface discontinuity (i.e. a reliable point). Local meshes are formed about reliable points on the frontier of the global mesh. Each local mesh is combined with the global mesh, thereby adding to the global mesh and advancing the frontier. Once no reliable points are left on the frontier, a local mesh may be formed about a point on the frontier that is more likely to lie near a surface discontinuity (i.e. an ambiguous point). The formation of local meshes can be repeated until no frontiers are left, or until all points have been added to the global mesh.

Advantageously, this mesh construction process only adds points defining triangles to the global mesh and never removes triangles.

Beneficially, a method exemplary of the present invention begins with points that lie on relatively flat and smooth surfaces, (i.e. reliable points) and advances the frontier of the mesh towards points that lie near surface discontinuities (i.e. ambiguous points). If 3D points are sampled at the edges and the corners of an object, then an edge is constructed at the location where two advancing frontiers meet, and a corner is constructed where three or more advancing frontiers meet.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

As the present invention is directed to methods and devices for polygonizing a collection of points recovered from one or more images depicting an object, the invention lends itself to implementation in computer software and hardware. A person of ordinary skill will readily appreciate that the methods may, for example, be embodied in software executing on a general purpose computing device, such as a personal computing device, graphics workstation, mainframe or the like; or in specialized hardware, such as an integrated circuit forming part of a computing device. For purposes of illustration only, the example embodiment of the invention is described as being embodied in computer software executing on a general purpose computing device.

Figure 1:
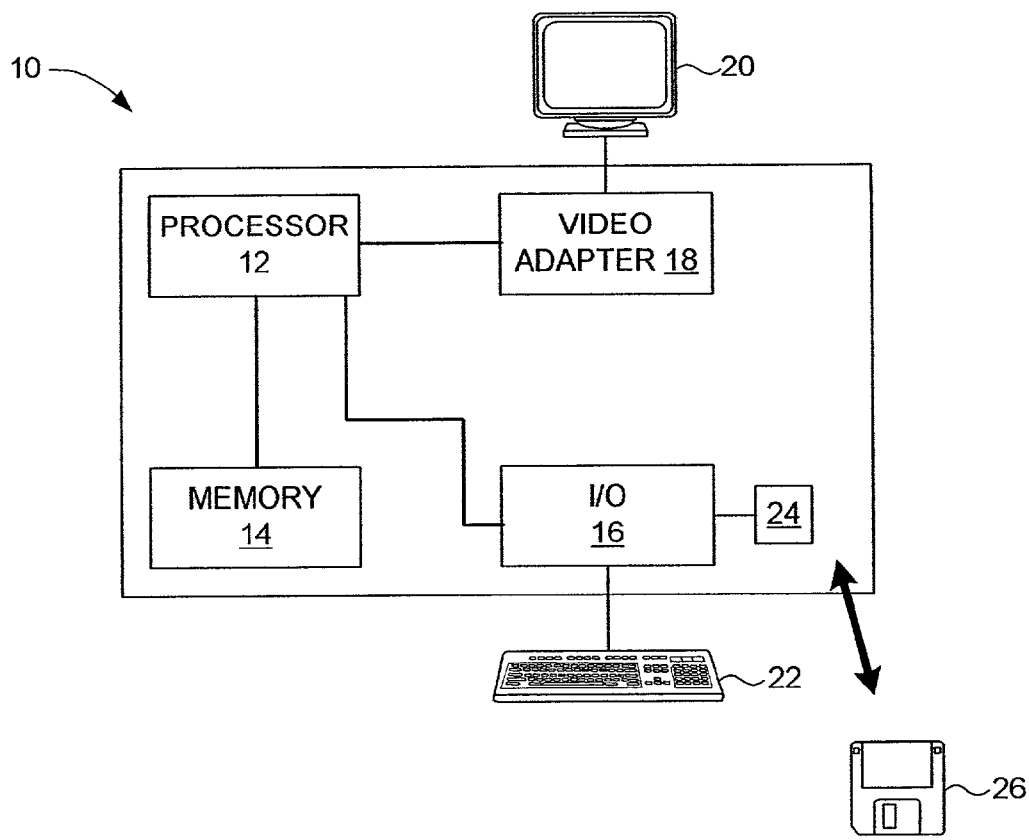
FIG. 1 illustrates an exemplary computing device, exemplary of an embodiment of the present invention.

Accordingly, FIG. 1 illustrates a conventional computing device 10 adapted to operate in manners exemplary of the present invention. Device 10 includes a processor 12, in communication with computer memory 14; input/output interface 16; video adapter 18 and a display 20. As well, device 10 may optionally include an input/output devices, such as a keyboard 22 and disk drive 24 and a mouse (not shown) or the like. As well, device 10 may include one or more network interfaces, and other hardware peripherals known to those of ordinary skill. Processor 12 may be a conventional central processing unit, and may for example be a microprocessor in the INTEL x86 family, a RISC processor, or the like. Computer memory 14 includes a suitable combination of random access memory, read-only-memory, and disk storage memory used by device 10 to store and execute software programs adapting device 10 to process images in manners exemplary of the present invention. Drive 24 is capable of reading and writing data to or from a computer readable medium 26 used to store software and data to be loaded into memory 14. Computer readable medium 26 may be a CD-ROM, diskette, tape, ROM-Cartridge or the like.

Figure 2:
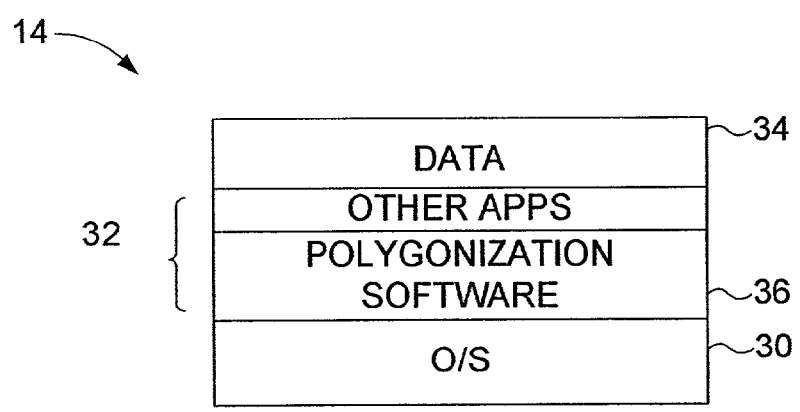
FIG. 2 illustrates an example organization of memory forming part of the device of FIG. 1.

An exemplary organization of computer storage memory 14 of device 10 is illustrated in FIG. 2. As illustrated, stored within memory 14 are computer software programs and data that are used by processor 12 to permit device 10 to be operable as general purpose computing device. As illustrated, memory 14 stores operating system software 30; application software 32; and data within data portion 34. Operating system software 30 may be an appropriate UNIX based operating system, Mircrosoft Windows operating system, or the like. Application software 32 includes polygonization software, 36, exemplary of an embodiment of the present invention. Application software 32 may also include other conventional software applications 38, not detailed herein. Data portion 34 may store data files representative of images depicting the object to be polygonized by software 36. Data files may be in any suitable graphics format such as jpeg, gif, or png formats or the like. Data within data portion 34 may be stored, processed and retrieved by processor 12 under control of application software 32 or operating system software 30.

Polygonization software 36 may be formed using conventional programming techniques. For example, polygonization software 36 may be formed as a result of compiled or interpreted program code written in a suitable conventional programming language such C, C++, Java, or the like.

Figure 3:
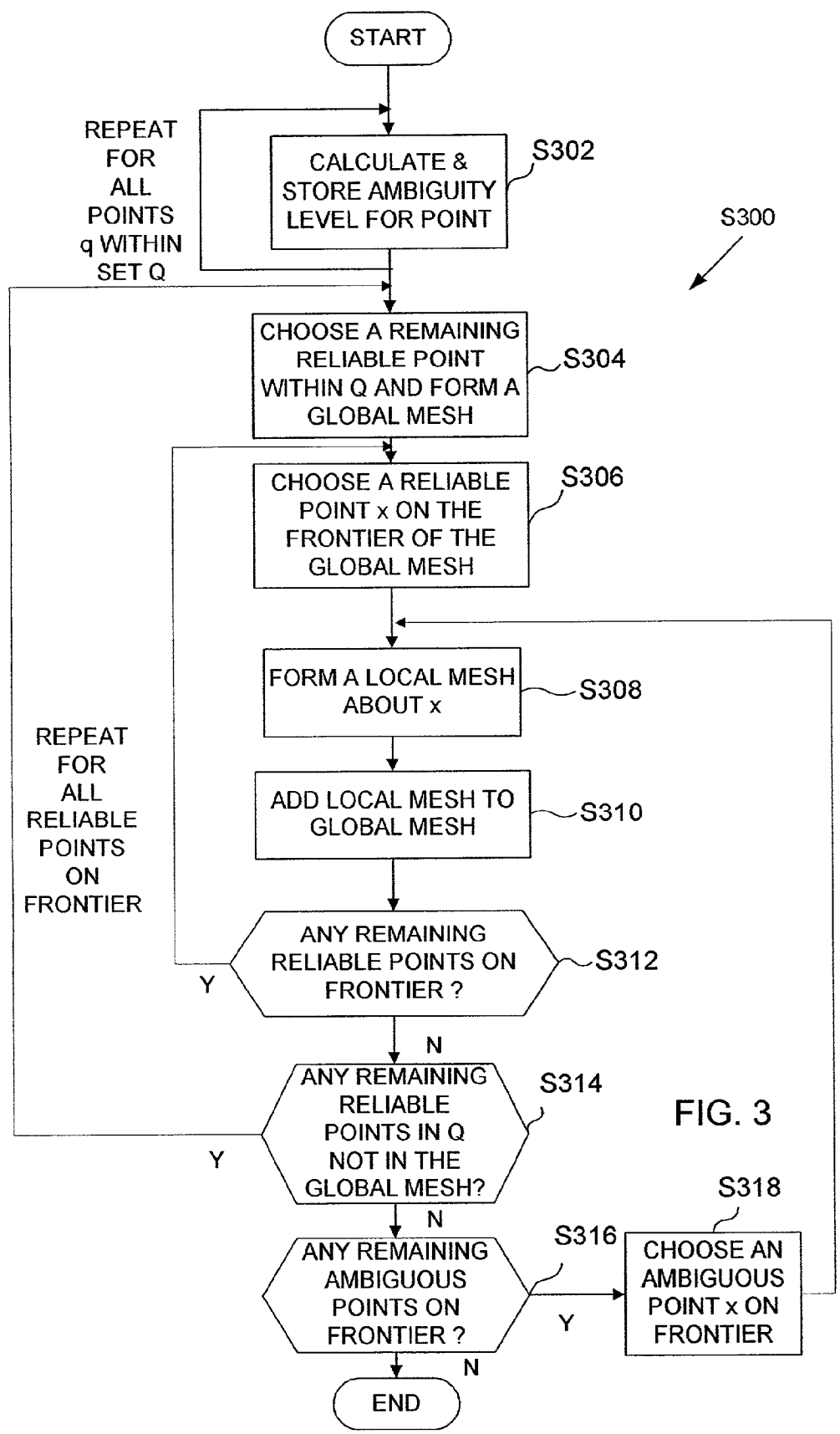
FIG. 3 illustrates steps exemplary of an embodiment of the present invention as performed by the computing device of FIG. 1.
Figure 4:
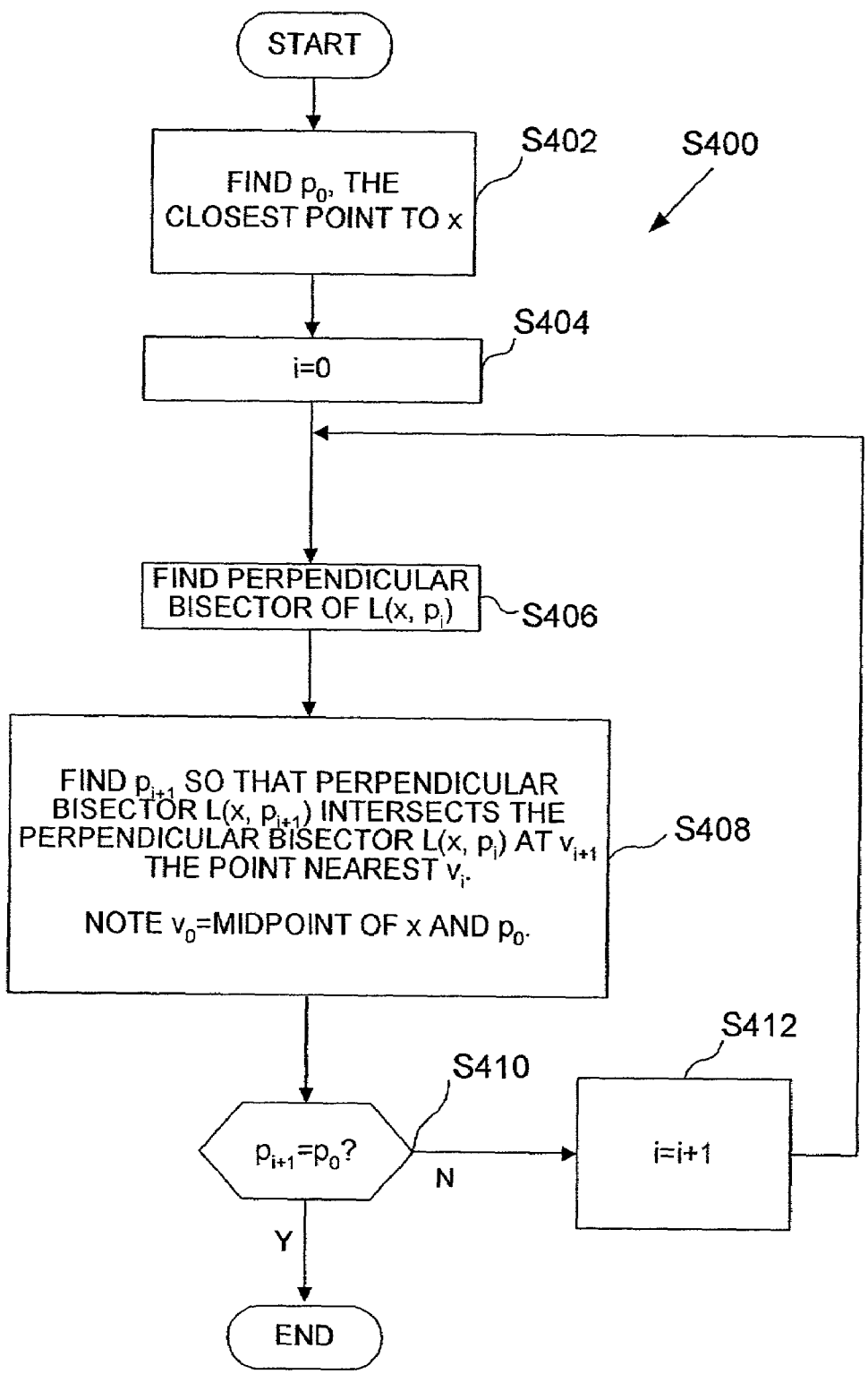
FIG. 4 illustrates steps used to form a mesh about a point, in a manner exemplary of an embodiment of the present invention and as performed by the computing device of FIG. 1.
Figure 5:
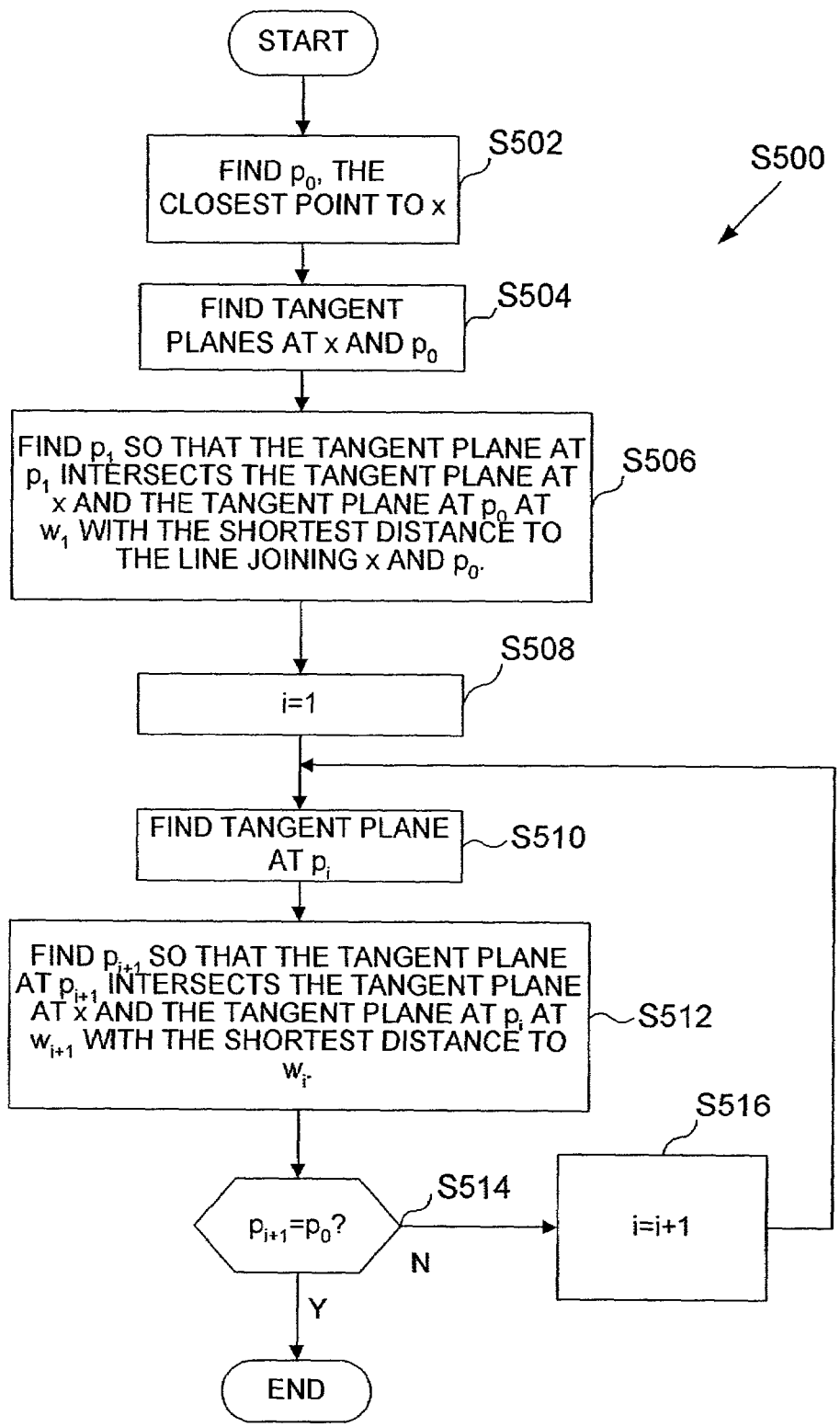
FIG. 5 illustrates alternative steps used to form a mesh about a point, exemplary of an embodiment of the present invention as performed by the computing device of FIG. 1.
Figure 6:
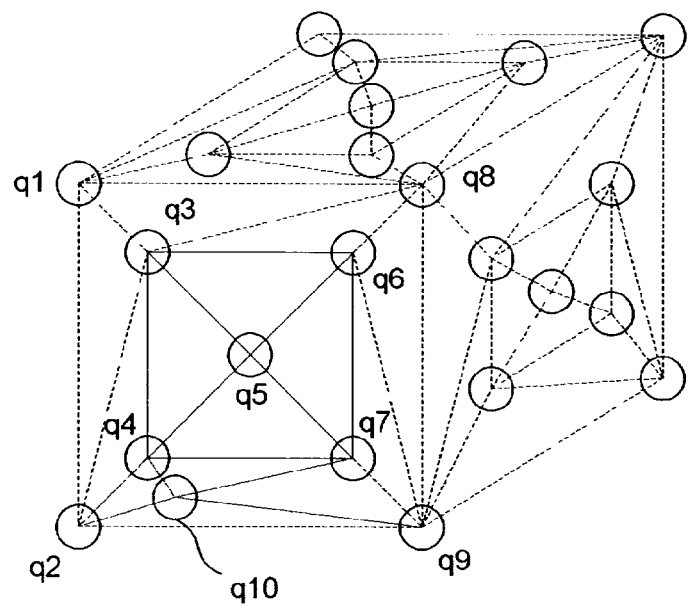
FIG. 6 illustrates example points as polygonized by methods exemplary of the present invention.

In a manner exemplary of the present invention, computing device 10 under control of polygonization software 36 constructs a mesh from a collection of 3D points extracted from one or more images depicting an object of interest. Steps exemplary of an embodiment of the present invention are illustrated in FIGS. 3–5. Preferably, the 3D points represent points on an object's surface. The 3D points may, for example, be acquired using a digital camera, scanner or the like, and suitable 3D reconstruction software known to those of ordinary skill. The 3D points may be stored in a suitable data file within data portion 34 (FIGS. 1 and 2) of memory 14. Two-dimensional points in one or more images may be mapped to 3D co-ordinates using a conventional 3D reconstruction algorithm. For purposes of explanation only, the set of 3D points to be polygonized will be referred to herein as Q ($q_1$, $q_2$, $q_3$, . . . $q_n$), $q \epsilon R^3$. For illustration, FIG. 6 illustrates twenty three example points that may be polygonized using methods exemplary of the present invention. For clarity, only ten of these points have been labeled $q_1$, $q_2$, $q_3$, . . . $q_{10}$.

Now, in order to polygonize the sampled points, computing device 10 under control of processor 12 performs example steps S300 (FIG. 3). In step S302 computes an indicator of the likelihood that each point within the set Q lies near a surface discontinuity of the image. Step S302 is repeated for each sample point within Q. Surface discontinuities include edges, and the intersection of two or more edges (i.e. edges or corners/cusps).

This likelihood may be computed in any number of ways. For example, the indicator of likelihood may be assessed using Principle Component Analysis (PCA) for a set of points in the neighborhood of the point of interest. That is, PCA may be applied to subsets of points within Q about the point of interest. As will be appreciated, PCA may be used to find the axes of a co-ordinate system defined by axes about which there is maximum and minimum variance of points within the subset. PCA may be performed by calculating a transformation that transforms the points about these axes. An example method for calculating such a transformation is referred to as a Hottelling Transform, and is for example detailed in R. Gonzalez et al., Digital Image Processing. (1992) Addison-Wesley Publishing Company, Reading, Mass.

Specifically, the Hottelling Transform matrix for an arbitrary set of points $S=(s_1, s_2, s_3, \ldots)$ in space may be calculated by calculating the mean vector of the points $$m_S = E\{s\}$$

and the covariance matrix for these points, $$C_S = E\{(s-m_S)(s-m_S)^T\}.$$

For M points in S, the mean vector and covariance matrix may be approximated as, $$m_S = \Sigma s_k / M$$

$$C_S = \Sigma s_k s_k^T / M - m_S m_S$$

For samples in three space, $C_S$ will result in a 3×3 real and symmetric matrix. As such, $C_S$ will always have three real eigenvalues and three orthogonal eigenvectors. Conveniently, the eigenvectors define the axes of a co-ordinate system about which there is maximum and minimum variance of points in S. The first eigenvector is oriented along the direction of the largest dispersion of the points, the second eigenvector along a direction of largest dispersion that is perpendicular to the first eigenvector, and the third eigenvector along the direction perpendicular to the first and second eigenvectors. The eigenvalues measure the amounts of dispersion along the three corresponding eigenvector directions.

The three eigenvalues may be used to assess the characteristics of a surface containing points S, and therefore a surface containing the point of interest within Q. In one sense, the eigenvalues measure the length, width, and thickness of the distribution of points about the axes: The flatter the collection of points, the smaller is the third eigenvalue. If the third eigenvalue (in decreasing order of magnitude) is close to 0, the surface is flat region, like a plane. On the other hand, if the third eigenvalue is large, the surface can be a highly curved smooth surface (with one or more bends), or can contain an edge or a corner. Conveniently, dividing the smallest (i.e. third) eigenvalue by the largest (i.e. first) is a way of normalizing the indicator of likelihood that a point is near a discontinuity so that it is independent of how densely or sparsely distributed the points are.

Based on this normalized value the point of interest within Q can be classified as ambiguous (i.e. likely near a surface discontinuity) or reliable (i.e. not likely near a surface discontinuity). For example, points within Q associated with a normalized value less than 0.05 may be classified as reliable; points within Q having a normalized value greater than or equal to 0.05 may be classified as ambiguous. Preferably, the normalized value of ambiguity (i.e. an indicator of likelihood that the point is near a surface discontinuity) is stored by software 36 in data portion 34 for each point in Q for later use. Of course, other thresholds appropriated for distinguishing between reliable and ambiguous points will readily be appreciated by persons of ordinary skill.

Conveniently, the third eigenvector of the Hotteling transform matrix defines the surface normal of the set of points S, and therefore approximates the surface normal at the point of interest within Q. This eigenvector may also be stored by software 36 in step S302 in data portion 34 for each point in Q for later use.

The points forming the set S (a subset of Q) used to compute the ambiguity for any particular point of interest within Q are chosen to be close to the point of interest. For example, S may be formed from the points within Q that are closer than a fixed distance, say, D, from the point of interest. Alternatively, S may be formed as a chosen number of points within Q closest to the point of interest. Heuristically, choosing the twenty (20) closest points within Q to form S appears to be a reasonable compromise between reconstruction quality and efficiency of reconstruction.

For the example points of FIG. 6 all points within a given distance of a point of interest may be used to calculate the ambiguity for each of the point.

Once the ambiguity level of each of the points within Q has been calculated in step S302 a mesh from the 3D points sampled from an object's surfaces that contain surface discontinuities may be constructed. Specifically, the mesh is preferably constructed starting from relatively smooth and flat surfaces, working progressively towards surface discontinuities. The relative smoothness and flatness of any surface proximate a point may be assessed using the indicator (ambiguity level) formed in step S302. Specifically, the mesh may be constructed as detailed in steps S304–S318.

As illustrated, an initial point that is not likely near a surface discontinuity (i.e. a reliable point) is selected in step S304 and a mesh is constructed about this initial point. This mesh may be considered to be the global mesh. Points about the initial point added to the global mesh are on its frontier.

Using the described PCA method for the example of FIG. 6, points $q_3$, $q_4$, $q_5$, $q_6$ and $q_7$, among others, will be classified as reliable.

A closed mesh around any point x may be constructed in numerous ways. Preferably, the closed mesh will contain the point x, as well as the nearest neighboring points within Q surrounding x. Example method steps S400 for forming a closed mesh are illustrated in FIG. 4. As illustrated, a closed mesh may be constructed by locating the nearest neighbor to x within Q (i.e. point $p_0$) in step S402. Next, in steps S406 and S408, using x and $p_0$, the point $p_1$ (within Q) for which a plane through the midpoint between x and $p_1$ having a normal in the direction of a vector defined by x and $p_1$ (referred to as $L(x,p_1)$—the perpendicular bisector of x and $p_1$), intersects the perpendicular bisector of x and $p_0$ (i.e. the plane $L(x, p_0)$) at a point $v_1$ nearest to the mid-point between x and $p_0$, is selected.

Figure 7:
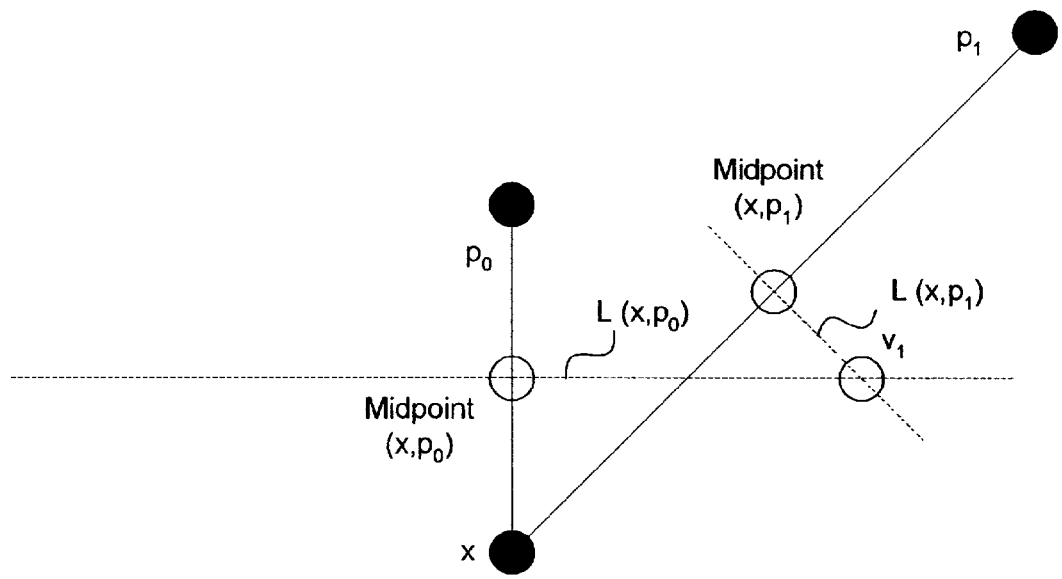
FIG. 7 further illustrates the formation of a mesh about a point, using steps illustrated in FIG. 4.

An example determination of $p_1$ and $p_2$ is illustrated in FIG. 7. As illustrated, the perpendicular bisector $L(x,p_1)$ intersects the perpendicular bisector of $L(x, p_0)$ closer to the midpoint of x and $p_0$ than does the perpendicular bisector of x and $p_2$, $L(x,p_2)$.

Repeating steps S406 to S410 using x and $p_1$, to find the point $p_2$ whose perpendicular bisector $L(x, p_2)$ intersects $L(x,p_1)$ at $v_2$, closest to $v_1$, to yields a third point on the mesh. Thereafter, steps S406 and onward may be repeated for integer increments of i (step S412) until $p_n = p_0$, (as determined in step S410) signifying that the mesh is closed. Of course, not all points within Q need be tested to determine a point $p_1$, $p_2$, and so on. Instead, only points within a certain distance from x may be tested as a closed mesh is formed. Again, for example, only points within a defined distance from x need to be tested. Alternatively, for efficiency, only the 20 closest points to x need be tested.

Alternatively, the calculation of steps S408 and S410 for i>1 may be replaced by computing the intersection of a plane at x and tangent thereto; the perpendicular bisecting plane L (x, $p_i$) and the perpendicular bisecting plane L(x,$p_{i+1}$). Again, the point $p_{i+1}$ yielding a point of intersection closest to the previously calculated point of intersection may be chosen.

As steps S400 only add points within Q to any mesh, steps S400 create an interpolating mesh for the points Q.

For example, the method applied to the points illustrated in FIG. 6 would construct a closed mesh around a point q5, as illustrated. This closed mesh includes points $q_3$, $q_4$, $q_7$ and $q_6$.

A representation of a calculated mesh may be stored within data portion 34 of memory 14. Specifically, the collection of points defining a mesh about a point of interest define an adjacency graph. This adjacency graph may or may not be permanently stored. A representation of the mesh may be stored by storing collections of three points (i.e. triplets), each collection defining a triangle on the mesh. Specifically, the global mesh may simply be a list of triplets, each defining one of the triangles defined by three adjacent points on the mesh. Each triplet may be stored in a chosen order (e.g. ordered clockwise or anti-clockwise).

For the initial global mesh, each triplet will include the initial point of interest. All points other than the initial point are on the frontier of this global mesh.

Once the initial global mesh is formed in step S304, local meshes about points on the frontier of the global mesh may be formed. These local meshes may again be temporarily stored. Portions of the local mesh not already part of the global mesh may be added. Specifically, in steps S306 a reliable point on the frontier is chosen. A local mesh is formed about this point in step S308. Triplets defining triangles not already part of the global mesh are added to the collection of triplets defining the global mesh in step S310. Specifically, these triplets may be appended to the collection of triplets defining the global mesh. Steps S306–S310 are repeated for each reliable point on the frontier of this global mesh, as a result of step S312. Again, the local mesh about any point may be formed using steps S400 (FIG. 4).

For the example of FIG. 6, a local mesh including point $q_2$, and $q_{10}$, may be formed about frontier point $q_4$ using steps S400.

To avoid adding overlapping triangles, each triangle within a local mesh is added to the global mesh only if it does not intersect any triangle in the global mesh. Intersection of triangles may be determined in any conventional manner, known to those of ordinary skill.

Occasionally, points lie on the surfaces of two or more objects that are widely separated. As such, steps S304 and onward performed once may result in polygonized points not including all reliable points within Q in the global mesh. As such, once step S314 is complete, and reliable points within Q have not yet been added to the resulting mesh, as determined in step S314, steps S304 may be repeated beginning with another reliable point within Q not already forming part of the mesh. At the next conclusion of performing step S314, two meshes will be formed, whose frontiers will not meet (which is the correct solution). Moreover, the frontiers at open boundaries (e.g., at edges having neigbouring points on only one side of the points—analogous to an infinitely thin sheet of paper) don't meet.

For both cases, the frontiers don't meet because there are no points in between them. If necessary, steps S304 and onward are repeated until no reliable points that do not form part of a global mesh exist.

Once local meshes have been formed about all reliable points and such local meshes have been added to the global mesh, a local mesh may be formed about an ambiguous point on the frontier of a mesh by repeating steps S308–S310 as a result of steps S316 and S318. Preferably, steps S308–S310 are performed in the increasing order of ambiguity for the remaining ambiguous points. Meshes are added for the least ambiguous points first. Again points not within this local mesh may be added to the global mesh. Steps S306–S314 are repeated until no frontier points remain or all points within Q have been added to a global mesh.

Once a point within Q is added to a global or local mesh, it need no longer be considered in polygonizing remaining points within Q. Eventually, all points within Q will typically be added to the global mesh. That is, frontiers must meet somewhere. Since the meeting place is at a surface discontinuity and therefore ambiguous, frontiers may meet at edges or at corners. Advantageously, the described method will form the best approximating surfaces based on the points. The converse: edges and corners are always constructed at the meeting places of frontiers because the points at edges and corners are most ambiguous. Once all points within Q have been so added, the object has been polygonized.

In an alternate embodiment, a closed mesh about a point x may be approximated. Specifically, a method forming an approximating mesh is illustrated in steps S500 of FIG. 5. Advantageously, the surface normal at each point within Q may be estimated in step S302, noting the third eigenvector calculated using PCA, as detailed above. Then, as illustrated an approximating mesh about any point x may be formed as follows. Find the nearest neighbor point $p_0$ within Q of point x in step S502. The tangent plane at x and $p_0$ are found in step S504. Thereafter, point $p_1$ within Q whose tangent plane intersects the tangent plane at x and the tangent plane at $p_0$ at a location $w_1$ with the shortest distance to the line joining x and $p_0$, is located in step S506. Thereafter, subsequent points $p_{i+1}$ within Q may be found in steps S508–S516 by locating $p_{i+1}$ having a tangent plane that intersects the tangent plane at x and the tangent plane at $p_i$ at the location $w_{i+1}$ with the shortest distance to the point $w_i$. Again, once $p_{i+1}=p_0$ the mesh is closed. Now, the intersection points $w_1$, $w_2$, . . . , $w_{i+1}$ may be used to form the mesh about x. Preferably, the points $w_1$, $w_2$, . . . , $w_{i+1}$ are stored and define a polygon about x. As these intersection points are not within Q the mesh is an approximating mesh. Now, as points on the frontier will be intersection points not within Q, subsequent meshes may be formed about points within Q closest to intersection points on the frontier, or otherwise corresponding to the intersection points.

If points involved in steps S504–S506 are ambiguous (as determined in step S302), then their surface normals should be re-estimated using reliable neighbors or neighbors whose surface normals have been re-estimated so that the tangent planes can be computed more accurately. For example, the surface normal at an ambiguous point may be re-estimated by linearly extrapolating the surface normal at the ambiguous point using surface normals at adjacent reliable points, or at ambiguous points for which a surface normal has already been re-estimated.

Now, as should be appreciated, in the described embodiments, the mesh construction process begins at points that lie on relatively flat and smooth surfaces, (i.e. reliable points)

and advances the frontier of the mesh towards points that lie neat surface discontinuities (i.e. ambiguous points). If 3D points are sampled at the edges and the corners, then an edge is constructed at the location where two advancing frontiers meet, and a corner is constructed where three or more advancing frontiers meet.

Of course, the above described embodiments, are intended to be illustrative only and in no way limiting. The described embodiments of carrying out the invention, are susceptible to many modifications of form, arrangement of parts, details and order of operation. For example, other techniques for forming a local mesh or global mesh may be employed in steps S304 and S308. That is, any conventional technique of forming local and global mesh could be used. This, in turn, would allow example steps S300 to be modified to form interpolating or approximating meshes for the object, other than those detailed herein.

Accordingly, the invention is intended to encompass all such modification within its scope, as defined by the claims.

What is claimed is:

1. A method of polygonizing an object, said object represented by a set Q of points in three space, said method comprising:
   a. for each of said points, calculating an indicator of the likelihood that said each of said point lies near a surface discontinuity of said object;
   b. constructing a global mesh having a frontier around one of said points having a low likelihood of lying near a surface discontinuity;
   c. constructing a local mesh about one of said points having a low likelihood of lying near a surface discontinuity, and on said frontier;
   d. combining said local mesh with said global mesh thereby adding points within said local mesh to said global mesh and advancing said frontier.

2. The method of claim 1, further comprising repeating said constructing a local mesh and said combining said local mesh for another one of said points on said frontier having a low likelihood of lying near a surface discontinuity.

3. The method of claim 2, further comprising repeating said constructing and said combining until a local mesh has been constructed about each of said points on said frontier having a low likelihood of lying near a surface discontinuity.

4. The method of claim 3, constructing a further local mesh about a point on said frontier not having a low likelihood of lying near a surface discontinuity;
   combining said further local mesh with said global mesh thereby adding points within said local mesh to said global mesh and advancing said frontier;
   repeating said constructing a local mesh and said combining said local mesh until a local mesh has been constructed about each of said points on said frontier having a low likelihood of lying near a surface discontinuity.

5. The method of claim 3, wherein each said indicator of a likelihood that each point lies near a surface discontinuity is computed using Principle Component Analysis (PCA).

6. The method of claim 5, wherein each said indicator of a likelihood that each said point lies near a surface discontinuity is computed by calculating a quotient of the smallest eigenvalue of a Hottelling tranform matrix of a collection of points within Q including said each sample point, divided by the largest eigenvalue of said Hottelling Transform matrix.

7. The method of claim 6, wherein said Hottelling Transform matrix for a point of interest within Q is calculated using a selected number of points within Q about said point of interest.

8. The method of claim 6, wherein said Hotteling Transform matrix for a point of interest is calculated using points within Q within a selected distance of said point of interest.

9. The method of claim 6, wherein said points having a low likelihood of lying near a surface discontinuity have an associated quotient of less than or equal to 0.05.

10. The method of claim 1, wherein said global mesh and said local mesh are interpolating meshes.

11. The method of claim 1, wherein said global mesh and said local mesh are approximating meshes.

12. The method of claim 1, wherein said constructing a local mesh about said frontier point comprises:
    finding the nearest neighbor $p_0$ to said frontier point;
    finding a point $p_1$ within Q so that the distance between an intersection at $v_1$ of a perpendicular bisector of a line joining said frontier point and $p_1$ and a perpendicular bisector of a line joining said frontier point and $p_0$, and a mid-point between said frontier point and $p_0$ is a minimum;
    for i=1,
    finding another point $p_{i+1}$ within Q so that the distance between an intersection at $v_{i+1}$ of a perpendicular bisector of a line joining said frontier point and $p_{i+1}$ and a line joining said frontier point and $p_i$, and $v_i$ is a minimum;
    repeating said finding another point, for integers i=2, 3, ... until $p_i$ coincides with $p_0$;
    using each point $p_0, p_1, p_2, \ldots p_i$ and said frontier point to form a closed mesh around said frontier point.

13. The method of claim 10, wherein said intersection $v_{i+1}$ is computed as an intersection of
    (i) a tangent plane at said frontier point,
    (ii) a plane at a mid point between said frontier point and $p_i$ with a normal pointing from said point on said frontier to $p_i$, and
    (iii) a plane at a mid point between said frontier point and $p_{i+1}$ with a normal pointing from said frontier point to $p_{i+1}$.

14. The method of claim 1, wherein said constructing a local mesh about said frontier point comprises:
    finding the nearest neighbor $p_0$ to a corresponding point in Q corresponding to said frontier point;
    finding a point $p_1$ within Q so that the distance between an intersection at $w_1$ of a tangent plane at said corresponding point, a tangent plane at $p_0$ and a tangent plane at $p_1$, and a line joining said corresponding point and $p_0$ is a minimum;
    for i=1,
    finding another point $p_{i+1}$ within Q so that the distance between an intersection at $w_{i+1}$ of a tangent plane at said corresponding point; a tangent plane at $p_i$, and a tangent plane at $p_{i+1}$ and $w_i$ is a minimum;
    repeating said finding another point, for integers i=2, 3, ... until $p_{i+1}$ coincides with $p_0$;
    using $w_1, w_2, \ldots w_{i+1}$ to form a closed mesh around said corresponding point, and thereby about said frontier point.

15. The method of claim 14 wherein a normal of a tangent plane at each point is computed along with an associated one of said indicators.

16. The method of claim 15, wherein said normals are calculated as eigenvectors of an associated Hottelling Transform matrix for each of said points.

17. A computing device, comprising:
    a processor;
    computer readable memory in communication with said processor, storing processor executable instruction that adapt said computing device to polygonize an object represented by a set Q of points within three space, by calculating an indicator of the likelihood that said each point lies near a surface discontinuity of said object, for each of said points;

constructing a global mesh having a frontier around one of said points having a low likelihood of lying near a surface discontinuity;

constructing a local mesh about one of said points having a low likelihood of lying near a surface discontinuity, and on said frontier;

combining said local mesh with said global mesh thereby adding points within said local mesh to said global mesh and advancing said frontier.

18. Computer readable medium storing processor executable instruction that, when loaded at a computing device adapt said computing to polygonize an object represented by a set Q of points within three space, by calculating an indicator of the likelihood that said each point lies near a surface discontinuity of said object, for each of said points;

constructing a global mesh having a frontier around one of said points having a low likelihood of lying near a surface discontinuity;

constructing a local mesh about one of said points having a low likelihood of lying near a surface discontinuity, and on said frontier;

combining said local mesh with said global mesh thereby adding points within said local mesh to said global mesh and advancing said frontier.

* * * * *